March 7, 1967  G. G. WARD  3,307,635
REVERSING MECHANISM FOR TWO WAY PLOW
Filed April 30, 1964  2 Sheets-Sheet 1
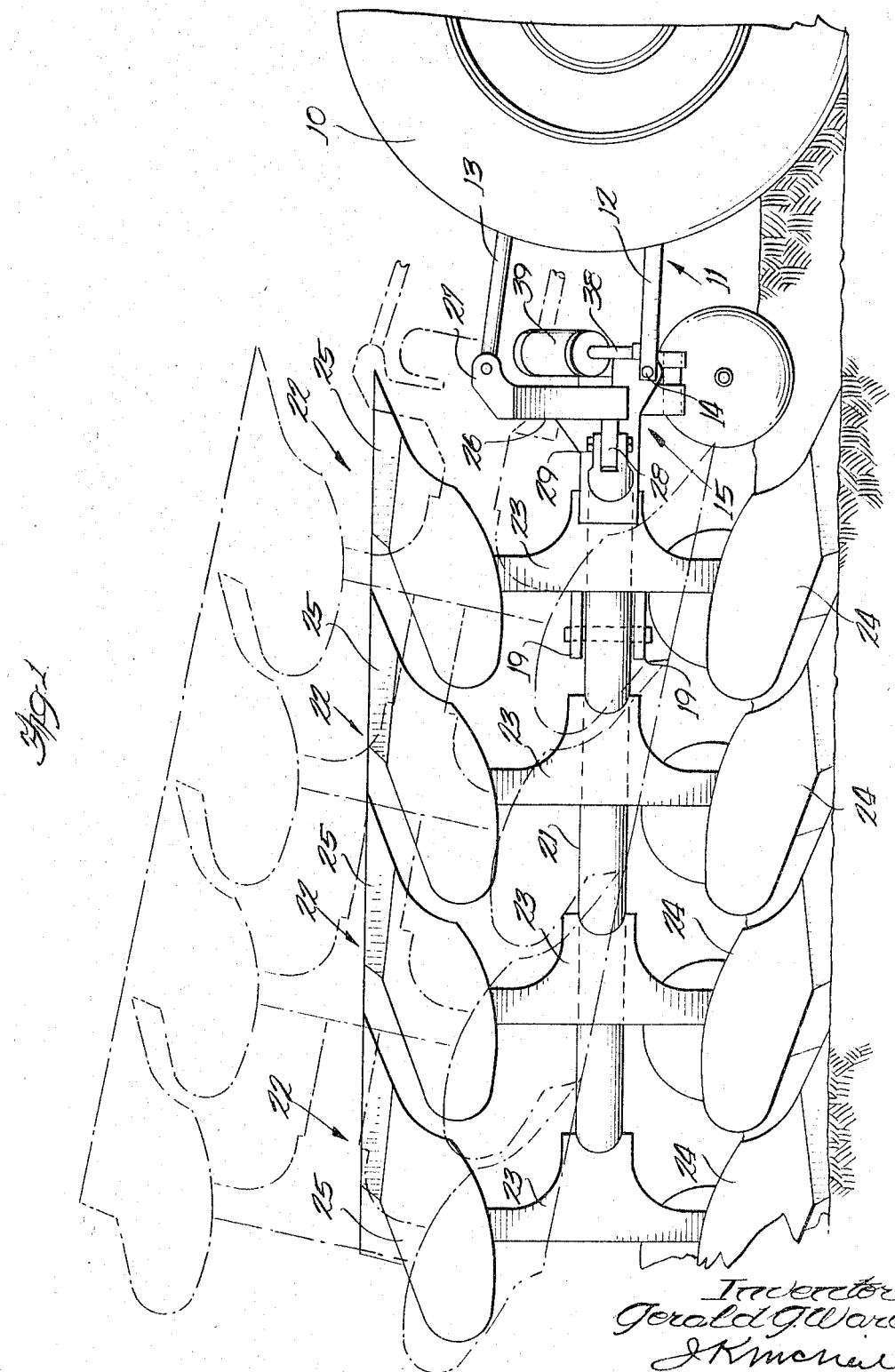
Inventor
Gerald G. Ward

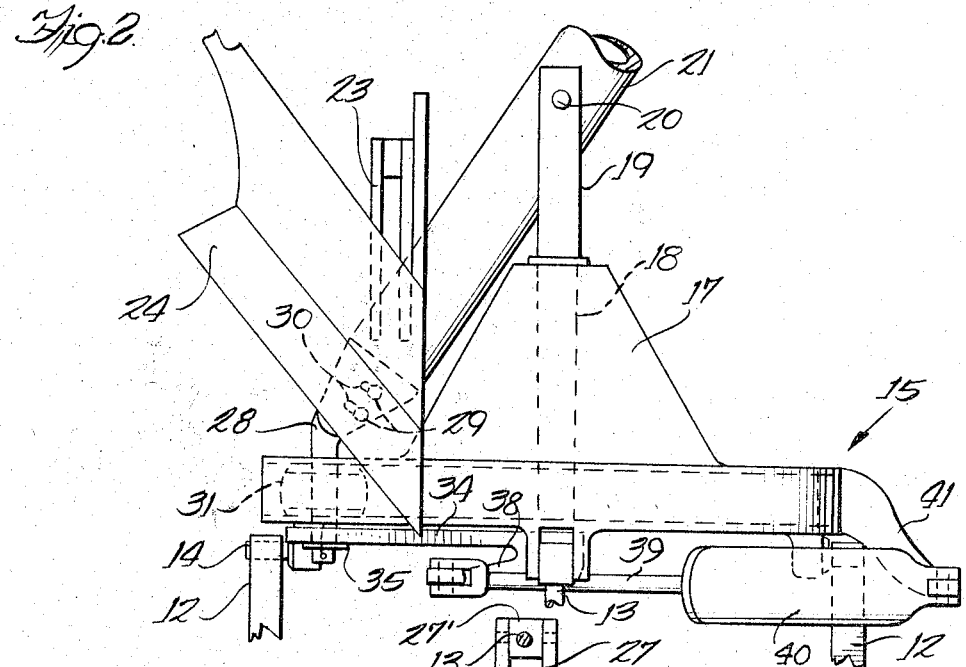
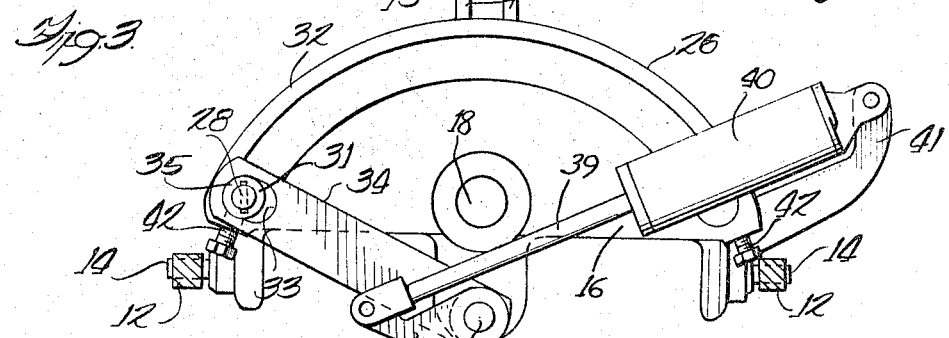
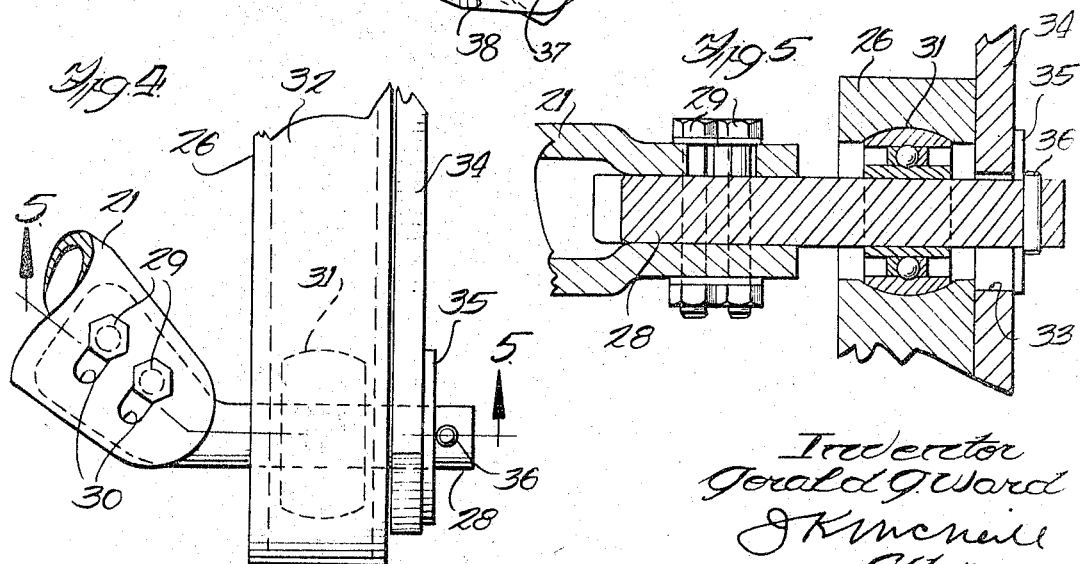

United States Patent Office 3,307,635
Patented Mar. 7, 1967

---

3,307,635
REVERSING MECHANISM FOR TWO WAY PLOW
Gerald G. Ward, Naperville, Ill., assignor to International Harvester Company, Chicago, Ill., a corporation of Illinois
Filed Apr. 30, 1964, Ser. No. 363,872
6 Claims. (Cl. 172—225)

This invention relates to implements and particularly to plows. More specifically, the invention concerns a tractor-mounted two-way plow of the type rotatable about a longitudinal axis to alternately dispose right and left-hand plow units in operation when the implement is raised above the ground.

Tractor-mounted two-way plows have increased in size with the increase in tractor power, and a multi-bottom plow involves a rather long plow carrier which extends diagonally of the direction of travel and must be revolved about a longitudinal axis which is disposed at an angle thereto. Such plows create ground-clearance problems when the carrier is revolved, and this invention has for its object the provision of a novel two-way plow of the roll-over type incorporating therein means for increasing the ground clearance when reversing the plow carrier.

Another object of the invention is the provision of an improved two-way plow construction wherein the plow carrier is pivotally connected to the rotatable support and means are provided for pivoting the carrier relative to its support during rotation thereof to reverse the plow units.

A further object of the invention is the provision of a novel roll-over two-way plow wherein the diagonal plow carrier is pivotally connected to the rotatable support and has a portion extending forwardly of said pivot and engageable with means on the stationary frame to swing the carrier about said pivot during the plow unit reversing operation.

Other objects and advantages of the invention will become clear from the following detailed description when read in conjunction with the accompanying drawings wherein:

FIGURE 1 is a view in side elevation of the rear end of a tractor having mounted thereon a two-way plow incorporating the features of this invention;

FIGURE 2 is a plan view, with parts removed, of an enlarged detail showing the main frame of the plow and the manner in which the plow carrier is attached thereto;

FIGURE 3 is a front elevation of the structure shown in FIGURE 2, with parts removed, illustrating the guide track and the power-operated mechanism for reversing the plow units;

FIGURE 4 is an enlarged detail showing the connection of the front end of the plow carrier to the guide track; and FIGURE 5 is a section taken on the line 5—5 of FIGURE 4.

Referring to the drawings, the numeral 10 designates one of the rear wheels of a tractor having a hitch structure 11 of the three-point type including a pair of laterally spaced lower links 12 and an upper link 13. The rear ends of lower links 12 are pivotally mounted on pins 14 at the ends of a tranvsersely-extending main plow frame 15 in including forward member 16 and a rearwardly-extending member 17, apertured to receive the forward end of a longitudinally-extending beam or shaft member 18, rotatable about its longitudinal axis and having affixed to its rear end a pair of vertically-spaced plates 19 carrying a pivot pin 20 upon which is mounted, between the plates 19, the forward portion of a diagonally-extending tool carrier 21 upon which a plurality of plow units 22 are mounted. Each of the plow units 22 includes a standard 23 perpendicular to the carrier 21 and extending from opposite sides of the axis thereof, right and left-hand plow bottoms 24 and 25, respectively, being mounted upon opposite ends of said standard.

Also affixed to the frame member 16 is an arcuately-shaped guide 26 extending upwardly therefrom in a vertical plane and having lugs 27 affixed to the central portion thereof and projecting upwardly therefrom. The rear end of upper link 13 is connected to a swivel 27' pivotally mounted between lugs 27.

As will be clear from FIGURE 1, the plow shown in the drawings is a longitudinally-elongated, multi-bottom plow wherein the tool carrier is mounted diagonally of the direction of travel and of the axis about which it turns to reverse the plow bottoms. As previously mentioned, inasmuch as revolving such a plow creates substantial ground-clearance problems, the present invention has been designed to provide a controlled lift of the entire plow carrier so that all of the plow units can be revolved upon lifting the implement above the ground, without danger of any of the plow units engaging the ground.

The forward end of the plow carrier 21 is provided with a member of relatively small diameter 28, angled with respect to the axis of the carrier and projecting forwardly therefrom. The rear end of member 28 is mounted in the bifurcated forward end of carrier 21 by a pair of bolts 29 in slots 30 provided in the carrier to angularly adjust carrier 21 relative to its supporting frame.

A roller 31 is mounted on member 28 and engages the undersurface of a forwardly-projecting flange 32 of guide member 26, and the forwardly-projecting end of member 28 extending beyond the roller 31 is loosely received in a slot 33 provided at the outer end of a lever 34.

A washer 35 is provided on member 28 in engagement with the outer surface of lever 34 and held in place by a pin 36.

The other end of lever 34 is affixed to the forward end of a longitudinally-extending rotatable shaft member 37. An arm 38 affixed to lever 34 on the axis of shaft 37 is pivotally connected at its end to a piston rod 39 slidable in a hydraulic cylinder 40 anchored to a lug 41 affixed to and projecting laterally from transverse frame member 16.

FIGURES 1, 2 and 3 show the positions of the parts when the right-hand plow bottoms are in operation, with the piston rod 39 extended. Upon retraction of the piston rod in the cylinder 40 lever 34 will swing about its axis, revolving shaft 18 until roller 31 engages the other end of track 26. Each end of the guide 26 has mounted therein a set screw 42 which is adjustable to vary the limits of travel of the roller 31 in its track.

Guide 26 functions as a cam, and while roller 31 is at the outer end of slot 33 in lever 34 in the operating position of the plow units shown in the drawings, upon lifting the implement and revolving the shaft 18 and carrier 21, the roller 31 is forced downwardly so that in mid-position it approaches engagement with the other end of the slot 33, swinging the carrier 21 about its pivot 20 and reducing the arc of travel, particularly of the rear and forward ends of the carrier and minimizing the likelihood of any of the plow units engaging the ground during reversal.

What is claimed is:
1. In a two way plow, a supporting frame including a transversely extending forward section and a longitudinally extending axially rotatable central section, an elongated carrier having right and left-hand plow units thereon disposed diagonally of the direction of travel and at an angle to said central section and rotatable therewith to alternately dispose said plow units in operating position, and pivot means for mounting said carrier on said rotatable central section for angling relative thereto on an axis disposed in a plane perpendicular to the axis of said central section, said carrier having portions extending forwardly and rearwardly of the axis of said pivot means, power operated means mounted on said transverse forward section, means operatively connecting said power operated means to said central section for rotating the latter about its axis including means operatively connected to the forwardly extending portion of said carrier to swing the latter about said axis of said pivot means simultaneously with the rotation of said central section.

2. The invention set forth in claim 1, wherein the forward end of said carrier is engageable with a stationary part on said frame during rotation of said central section, and said part cooperates with the forward portion of said carrier to swing the latter about its pivot axis on said central section during rotation thereof.

3. The invention set forth in claim 2, wherein said part is an arcuately shaped transversely extending cam track with which the forward end of said carrier is engageable throughout its path of rotation about the axis of said central section.

4. The invention set forth in claim 3, wherein a roller is mounted on the forward end of said carrier and is seated in said cam track.

5. The invention set forth in claim 4, wherein an arm is secured to said central section and is connected to said power operated means for rocking the central section about its axis and wherein said arm is provided with a slot to receive an dconfine said roller while accommodating said pivoting of the carrier.

6. The invention set forth in claim 5, wherein adjustable stop means is provided at each end of said cam track and engageable with said roller, said stop means being adjustable to vary the extent of travel of said roller in said cam track.

References Cited by the Examiner

FOREIGN PATENTS

| | | |
|---|---|---|
| 1,006,709 | 1/1952 | France. |
| 1,268,430 | 6/1961 | France. |
| 1,001,033 | 1/1957 | Germany. |
| 819,081 | 8/1959 | Great Britain. |
| 246,435 | 9/1947 | Switzerland. |

ABRAHAM G. STONE, *Primary Examiner.*

R. L. HOLLISTER, *Assistant Examiner.*